US008301369B2

(12) United States Patent
Hiruta et al.

(10) Patent No.: US 8,301,369 B2
(45) Date of Patent: Oct. 30, 2012

(54) POSITION DETECTION APPARATUS AND POSITION DETECTION PROGRAM

(75) Inventors: Tomoaki Hiruta, Hitachi (JP); Toshiyuki Aoki, Hitachi (JP); Takayoshi Yokota, Hirakata (JP); Mikio Bando, Mito (JP); Kazuhiro Okada, Ebina (JP)

(73) Assignee: Clarion Co., Ltd., Tokyo (JP)

( * ) Notice: Subject to any disclaimer, the term of this patent is extended or adjusted under 35 U.S.C. 154(b) by 152 days.

(21) Appl. No.: 12/818,435

(22) Filed: Jun. 18, 2010

(65) Prior Publication Data

US 2010/0324815 A1    Dec. 23, 2010

(30) Foreign Application Priority Data

Jun. 18, 2009    (JP) .................................. 2009-145212

(51) Int. Cl.
    *G01C 21/00*    (2006.01)
(52) U.S. Cl. ........................................................ 701/408
(58) Field of Classification Search .................. 701/408, 701/409, 412, 445–447, 461, 467–470
See application file for complete search history.

(56) References Cited

U.S. PATENT DOCUMENTS

| | | | |
|---|---|---|---|
| 5,323,152 A * | 6/1994 | Morita | 340/988 |
| 5,508,931 A | 4/1996 | Snider | |

FOREIGN PATENT DOCUMENTS

| | | |
|---|---|---|
| DE | 44 32 208 | 3/1995 |
| EP | 2 045 577 | 4/2009 |
| JP | 09-152343 | 6/1997 |
| JP | 2005-132291 | 5/2005 |
| JP | 2008-020365 | 1/2008 |
| WO | WO 2008/010046 | 1/2008 |

OTHER PUBLICATIONS

Najjar, et al., "A Road-Matching Method for Precise Vehicle Localization Using Belief Theory and Kalman Filtering", vol. 19, No. 2, Sep. 1, 2005, pp. 173-191.

* cited by examiner

*Primary Examiner* — Kim T Nguyen
(74) *Attorney, Agent, or Firm* — Antonelli, Terry, Stout & Kraus, LLP.

(57) ABSTRACT

A position detection apparatus includes a storage unit for storing map information including road information; a detection unit for detecting information for calculating an absolute position of a moving object; a position calculation unit for calculating the absolute position of the moving object and an error variance relating to an error of the moving object from the detected information; a read-out unit for reading out from the storage unit the road information of a road relating to the calculated absolute position; an existence probability calculation unit for calculating an existence probability of the moving object existing on the road from the absolute position, the error variance, and the read-out road information; a selection unit for selecting a position whose existence probability is maximum out of the calculated existence probability; and a map-matching processing unit for making the selected position a position of the moving object on the road.

9 Claims, 16 Drawing Sheets

FIG.2A  Road Data

| Link ID | |
|---|---|
| Mesh ID | |
| Start End | Node ID |
| | Latitude |
| | Longitude |
| Finish End | Node ID |
| | Latitude |
| | Longitude |
| Detailed Information | |
| Number of Connection Road Links n | |
| #1 | Connection Node |
| | Connection Road Link ID |
| ⋮ | |
| #n | Connection Node |
| | Connection Road Link ID |
| Link ID | |
| ⋮ | |

FIG.2B  Detailed Information

| Road Link Length | |
|---|---|
| Road Classification | |
| Number of Lanes | |
| Presence or Absence of One-Way Traffic | |
| Link Angle | |
| Regulation Speed | |
| Number of Interpolation Points m | |
| #1 | Latitude |
| | Longitude |
| ⋮ | |
| #m | Latitude |
| | Longitude |

FIG.2C  Mesh Control Table

| Mesh ID | |
|---|---|
| Lower Left Coordinates | Latitude |
| | Longitude |
| Upper Left Coordinates | Latitude |
| | Longitude |
| Lower Right Coordinates | Latitude |
| | Longitude |
| Upper Right Coordinates | Latitude |
| | Longitude |
| Mesh ID | |
| ⋮ | ⋮ |

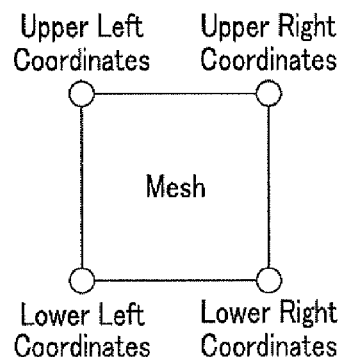

FIG.18

700 Own-Vehicle Position Information

| Own-Vehicle Position | Latitude |
| --- | --- |
|  | Longitude |
| Error Ellipse | Standard Deviation in Long Axis Direction ($\sqrt{\lambda 1}$) |
|  | Standard Deviation in Short Axis Direction ($\sqrt{\lambda 2}$) |
|  | Angle |
| Mesh ID | |
| Link ID | |
| Start End | Node ID |
|  | Latitude |
|  | Longitude |
| Finish End | Node ID |
|  | Latitude |
|  | Longitude |
| Link Length | |
| Distance from Start Point to Own-Vehicle Position on Road | |
| Likelihood | |

# POSITION DETECTION APPARATUS AND POSITION DETECTION PROGRAM

BACKGROUND OF THE INVENTION

1. Field of the Invention

The present invention relates to a position detection apparatus and a position detection program.

2. Description of the Related Art

A navigation device, used in a moving object, especially in an automobile, overlappingly displays an own-vehicle position on map data stored on a storage medium such as a hard disk drive, wherein the position is detected by using a radio navigation method such as a GPS (Global Positioning System) and a beacon; and an inertial navigation method such as a gyro and a vehicle speed pulse provided in an automobile main body and an in-vehicle terminal. Furthermore, the navigation device searches a route from the own-vehicle position detected on the map to a destination set by a driver and guides her/him to the destination.

However, an error is included in the own-vehicle position detected. The error is due to a sensor mounted on the automobile. For example, there are an error due to a multipath of a GPS, an error due to a wheel slip in using a vehicle speed pulse, an accumulation error of a gyro, and the like. Consequently, in order not to display a detected own-vehicle position away from a road where an automobile is travelling, there is a correction technology (map-match technology) to move the own-vehicle position to a position on the road.

Furthermore, an error is also included in road data of a map. Therein are included an error when the map data is made, and an error due to an approximation and expression of a road contour by a plurality of segments. Also with respect to road data including such errors, an own-vehicle position must be decided on a road along a route in order to guide a driver.

For that purpose is disclosed a vehicle-position detection apparatus that acquires road data around an own-vehicle position; calculates a similarity degree between a road contour and a vehicle travel orbit derived from a GPS, a vehicle speed sensor, and a distance sensor; and performs map-matching to a position on a road with a large similarity degree (for example, see Japanese Patent Laid-Open Publication No. JP H09-152343). The similarity degree is computed on the basis of a road azimuth, and a current position and travel azimuth of a vehicle.

Furthermore, a technology is disclosed that estimates a positioning error due to an inertial navigation method by: accumulating detection information of an autonomous sensor for detecting behavior information of an automobile; detecting an inertial positioning location of a moving object; applying an variance (hereinafter referred to as an "error variance") with respect to an error of the inertial positioning location at a time t, and a sensor error variance and calculation error of the autonomous sensor to an update equation based on a moving-object model; and asymptotically calculating an error variance of a time t+1 (for example, see Japanese Patent Laid-Open Publication No. JP 2008-20365). According to the technology, it is determined whether position coordinates of an intersection node stored in a map data base of a navigation device is included in a reliability error ellipse generated from an error variance, and when it is included, an attention is drawn to a driver, and thereby a warning is given to her/him.

However, according to the technology described in the Japanese Patent Laid-Open Publication No. JP H09-152343, although information is calculated with respect to an own-vehicle position and an azimuth by using data obtained from a sensor, there is a limit to the accuracy of the map matching because a sensor error changing in time series is not considered.

Furthermore, according to the technology described in the Japanese Patent Laid-Open Publication No. JP 2008-20365, although an own-vehicle position and its error variance are sequentially updated by using the inertial navigation method, a radio navigation method such as a GPS is not used. Furthermore, noting only a relationship between the error variance and the intersection node of the map data base stored in the navigation device, the technology does not consider performing the map matching to road data where the map data base is used.

According to a conventional technology, when map-matching an own-vehicle position, which is calculated by using data including an error acquired from a sensor, to map data including an error, a foot of a perpendicular line is drawn to a road link in the map data from the calculated own-vehicle position, a Ucrid distance is calculated between the position and the foot, and the foot having a minimum distance is made the map-matched own-vehicle position. However, according to this technology, because the error of the calculated own-vehicle position is not considered, the map-matched own-vehicle position is largely displaced from an actual own-vehicle position in some cases.

SUMMARY OF THE INVENTION

Consequently, in view of such a background, the present invention is performed: the invention considers an own-vehicle-position error generated from a sensor error changing in time series, where the radio navigation technology and the inertial navigation method are used in the sensor; and provides a position detection apparatus and a position detection program that perform highly accurate map-matching processing.

According to the position detection apparatus and position detection program of the invention, the own-vehicle position and an error variance are calculated on the basis of information from a detection unit including a GPS receiver, an angular speed sensor, and a vehicle speed sensor; and a map-matching processing is performed for road data around the own vehicle by using the own-vehicle position and the error variance calculated, and map data stored in a map information data base (DB). Then, out of map-matching candidate points of each road for which the map-matching processing is performed, a candidate point, whose likelihood is maximum, is selected as the own-vehicle position on the map.

BRIEF DESCRIPTION OF THE DRAWINGS

FIGS. 2A, 2B, and 2C are drawings showing data configurations of a map information DB according to the embodiment, respectively.

FIG. 18 is a drawing showing a data configuration of own-vehicle-position information according to the embodiment.

BEST MODE(S) FOR CARRYING OUT THE INVENTION

Next will be described an embodiment of the present invention in detail with reference to drawings as needed.

Figure 1:
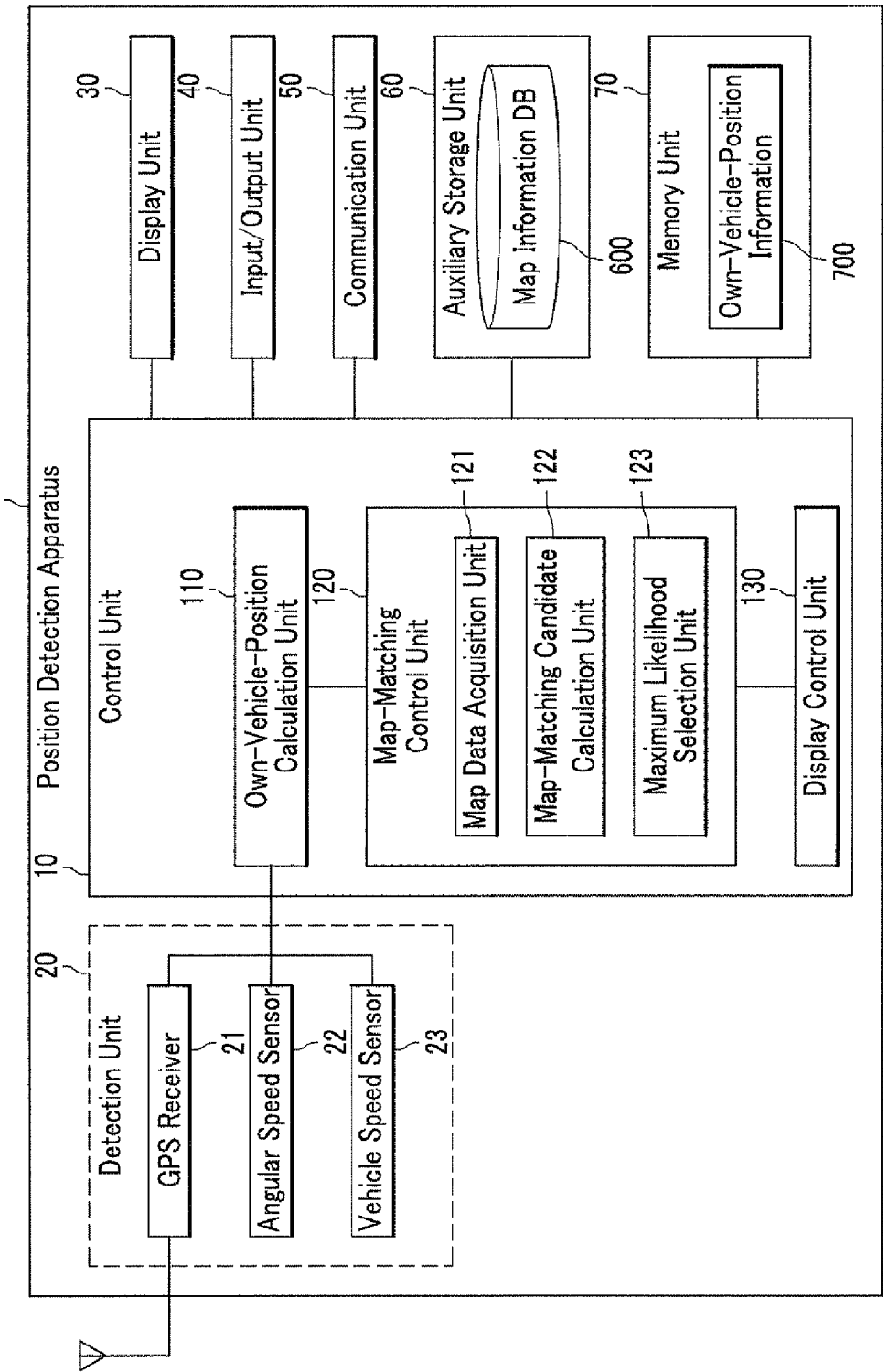
FIG. 1 is a function block diagram showing a configuration example of a position detection apparatus according to an embodiment of the present invention.

FIG. 1 is a function block diagram showing a configuration example of a position detection apparatus according to an embodiment.

As shown in FIG. 1, a position detection apparatus 1 comprises a control unit 10, a detection unit 20, a display unit 30, an input/output unit 40, a communication unit 50, an auxiliary storage unit 60, and a memory unit 70.

The detection unit 20 comprises a detection device such as a sensor for calculating an own-vehicle position and transfers detected information to the control unit 10. Furthermore, the detection unit 20 comprises a GPS receiver 21, an angular speed sensor 22, and a vehicle speed sensor 23.

The GPS receiver 21 receives an electric wave for detecting the own-vehicle position, based on the wave from a GPS satellite. Therefore, the detection unit 20 can calculate a distance to the GPS satellite according to four or more electric waves received by the GPS receiver 21, and position a point, where the own vehicle and the distance are intersected, as the own-vehicle position.

The angular speed sensor 22 comprises a gyro sensor and detects a rotational angular speed, using inertia. As a method of using the inertia, there is a method of using a Coriolis force. The gyro sensor is a sensor for outputting a voltage and the like proportional to the rotational angular speed.

The vehicle speed sensor 23 comprises a sensor for outputting a pulse signal generated along a rotation of vehicle tires. A pulse number detected by the vehicle speed sensor 23 can be converted to a vehicle speed by being multiplied by a pulse coefficient. However, an error in speed occurs in some cases due to a tire pneumatic pressure, a tire slip, and the like.

The control unit 10 collects information relating to the own-vehicle position through the detection unit 20, uses the information and calculates the position, and performs a map-matching processing so that the position is set on a road link in map data. Furthermore, the control unit 10 comprises an own-vehicle-position calculation unit (position calculation unit) 110, a map-matching control unit 120, and a display unit 130.

In addition, a function of the control unit 10 is achieved by, for example, a CPU (Central Processing Unit) developing a program, which is stored in the auxiliary storage unit 60 of the position detection apparatus 1 to the memory unit 70, and performing the program.

The own-vehicle-position calculation unit (position calculation unit) 110 uses position information obtained from waves received by the GPS receiver 21 of a radio navigation method, an angular speed obtained from the angular speed sensor 22 comprising such a gyro sensor of an inertial navigation method, and a vehicle speed obtained from the speed sensor 23; and calculates the own-vehicle position (moving-object absolute position) and an error variance thereof. A Kalman filter of a publicly known technology is used for this calculation processing. The Kalman filter repeats a prediction and an update based on a time, and thereby, infers a system state quantity for minimizing a root-mean-square error.

The map-matching control unit 120 uses an own-vehicle position and an error covariance matrix of the position at a time t calculated by the own-vehicle-position calculation unit 110, acquires road data around the position from a map information DB 600 in the auxiliary storage unit 60 described later, decides the position on a most likely road link, and memorizes the position in the memory unit 70 as own-vehicle-position information 700

Furthermore, the map-matching control unit 120 comprises a map data acquisition unit (read-out unit) 121, a map-matching candidate calculation unit 122, and a maximum likelihood selection unit 123.

The map data acquisition unit (read-out unit) 121 decides a map range (mesh) to acquire map data, from the own-vehicle position and its error covariance matrix calculated by the own-vehicle-position calculation unit 110, and acquires relevant road data from the map information DB 600 stored in the auxiliary storage unit 60.

The map-matching candidate calculation unit 122 performs a map-matching processing from the own-vehicle position and its error covariance matrix with respect to the road data, decides a map-matching candidate point, and calculates its likelihood. In the embodiment the likelihood is an index for representing a probable degree of the own-vehicle position on a road set by the map-matching processing and is represented, for example, by a probability and a distance.

The maximum likelihood selection unit 123 compares all likelihoods of each map-matching candidate point decided by the map-matching candidate calculation unit 122, and selects a road link having the maximum likelihood. Then the maximum likelihood selection unit 123 decides the own-vehicle position on the map-matched road, and memorizes information relating to the position decided and that of the road link having the maximum likelihood in own-vehicle-position information 700 of the memory unit 70.

The display control unit 130 uses the own-vehicle position on the road, which is memorized in the own-vehicle-position information 700 of the memory unit 70, and the map data memorized in the map information DB 600; and displays the position in the display unit 30.

Next, the display unit 30 is configured with a liquid crystal display and the like, and displays a road condition, guidance, or the like under the control of the display control unit 130. Furthermore, the display unit 30 displays a screen for receiving an instruction from an outside through the input/output unit 40.

The input/output unit 40 is configured, for example, with a remocon (remote control), a touch panel, or the like, and receives an instruction from an outside to the position detection apparatus 1. Furthermore, under the control of the control unit 10, the input/output unit 40 outputs voice guidance and the like through a not shown speaker according to various processings of the position detection apparatus 1.

The communication unit 50 acquires information such as traffic information from a center through a communication line not shown.

The auxiliary storage unit 60 comprises a storage device such as a hard disk and a flash memory, including the map information DB 600. In the map information DB 600 is stored information relating to a node (an intersection, a divided point at every predetermined interval from an intersection, and the like) and a link (a road connecting a node and another node).

FIGS. 2A, 2B, and 2C are drawings showing data configurations of the map information DB 600 according to the embodiment, respectively.

FIG. 2A shows a configuration of road data stored in the map information DB according to the embodiment. The map information DB 600 is configured as an aggregation of the road data, and the road data is configured with a link unit from a node to a node. Each road data includes a link ID (Identification) for identifying a road, a mesh ID where a road link having the link ID exists, a node ID of a start end (start point) of the road link and longitude/latitude information of the node ID, a node ID of a finish end (finish point) of the road link and longitude/latitude information of the node ID, a number of connection-road links indicating the number of the connection-road links connecting to the road link, a connection node ID indicating a node ID of a node connecting to another road link and a link ID of a road link connecting to the connection node, and detailed information of the road link firstly described.

Here, a mesh is a thing where a map is divided like a network, based on a latitude and longitude. A secondary mesh is mesh data corresponding to about 10 km in each side length: a latitude difference of five minutes; and a longitude difference of seven minutes and 30 seconds. Furthermore, a tertiary mesh is a zone obtained by equally dividing the secondary mesh into ten in a latitude direction and a longitude direction, and corresponds to about 1 km in each side length: a latitude difference of 30 seconds; and a longitude difference of 45 seconds. It is possible to identify the mesh by the mesh ID.

FIG. 2B is a data configuration of detailed information of the road link in FIG. 2A.

The detailed information includes a road link length, a road classification, a number of vehicle lanes, a presence or absence of one-way traffic, a link angle, a regulation speed, a number of interpolation points configuring the road link, and position information of latitude and longitude of each interpolation point. The road link length is a length from the start point of a road link to the finish point thereof. The road classification represents a road class: for example, an expressway as "1," an expressway in a city as "2," a national road and a prefecture road as "3," a city road as "4," and others as "5." The number of vehicle lanes represents a number of vehicle lanes existing in the road. The presence or absence of one-way traffic is set, for example, as "1" in one-way traffic and as "0" in a case of two-way traffic being available. The link angle represents an angle from the start point of the road link and the finish point thereof. The interpolation point is a thing for setting in detail the shape of the road link expressed by a segment from the start point of the road link to the finish point thereof and is configured with latitude/longitude information.

FIG. 2C shows a mesh control table. In the mesh control table are stored the mesh ID and coordinates of mesh vertices: coordinates (latitude/longitude) of a lower left vertex; an upper left vertex; a lower right vertex; and an upper right vertex.

Returning to FIG. 1, the memory unit 70 comprises a primary memory device such as a RAM (Random Access Memory), and on the unit 70 is memorized the own-vehicle-position information 700 set by the processing of the map-matching control unit 120. A specific configuration example of the own-vehicle-position information 700 will be described later with reference to FIG. 18.

Next will be described a processing flow of the position detection apparatus 1 with reference to FIGS. 1 to 2C and along FIGS. 3 to 19.

Figure 3:
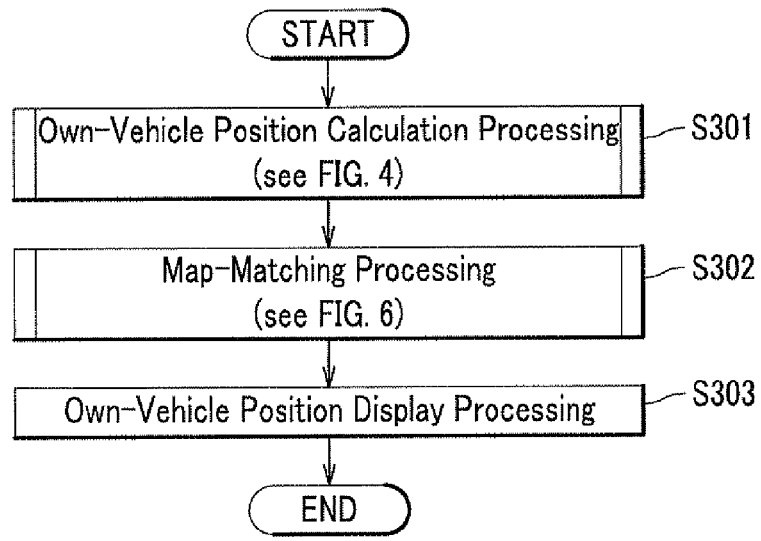
FIG. 3 is a flowchart showing a whole operation procedure of the position detection apparatus according to the embodiment.

FIG. 3 is a flowchart showing a whole operation procedure of the position detection apparatus 1 according to the embodiment.

Firstly, the own-vehicle-position calculation unit 110 of the position detection apparatus 1 performs an own-vehicle-position calculation processing for detecting an own-vehicle position, based on information acquired from the detection unit 20 (step S301). According to the own-vehicle-position calculation processing, the own-vehicle-position calculation unit 110 uses information acquired from the GPS receiver 21 of a radio navigation method, and information acquired from the angular speed sensor 22 and the vehicle speed sensor 23 that are an inertial navigation method; and calculates the own-vehicle position and an error variance thereof. In addition, this own-vehicle-position calculation processing will be described later in detail with reference to FIG. 4.

Next, based on the own-vehicle position and its error covariance matrix calculated by the own-vehicle-position calculation unit 110, the map-matching control unit 120 performs a map-matching processing, selects a road link whose likelihood is maximum, and decides the own-vehicle position on the road (step S302). In addition, this map-matching processing will be described later in detail with reference to FIG. 6.

Then the display control unit 130 performs an own-vehicle-position display processing in the display unit 30, based on the own-vehicle-position information 700 obtained through the map-matching processing by the map-matching control unit 120 (step S303).

Hereafter will be specifically described each processing.

Firstly will be described the own-vehicle-position calculation processing performed by the own-vehicle-position calculation unit 110 in the step S301 of FIG. 3.

Figure 4:
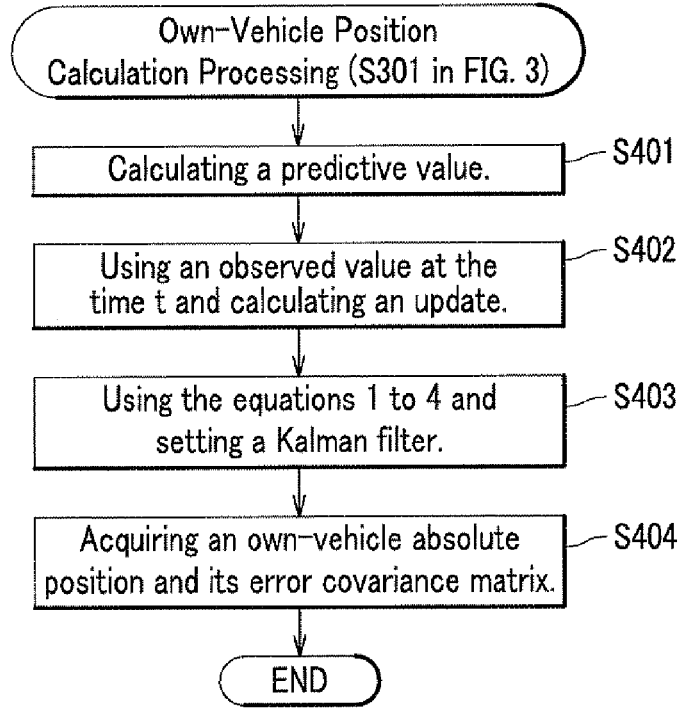
FIG. 4 is a flowchart showing an operation procedure of an own-vehicle-position calculation processing performed by an own-vehicle-position calculation unit according to the embodiment.

FIG. 4 is a flowchart showing the operation procedure of the own-vehicle-position calculation processing performed by the own-vehicle-position calculation unit 110 according to the embodiment. Furthermore, FIG. 5 is a drawing showing a dynamic model for illustrating the own-vehicle-position calculation processing performed by the own-vehicle-position calculation unit 110 according to the embodiment.

The own-vehicle-position calculation unit 110 firstly calculates a predictive value, in order to use a Kalman filter and derive the own-vehicle position and its error covariance matrix (step S401).

Figure 5:
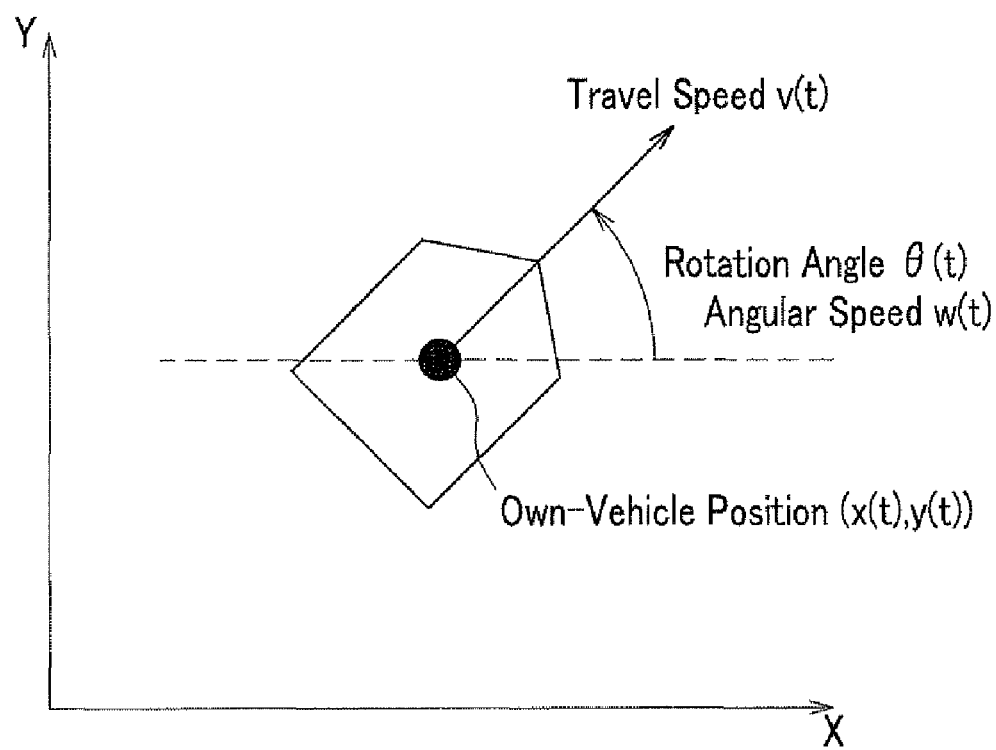
FIG. 5 is a drawing showing a dynamic model for illustrating the own-vehicle-position calculation processing performed by the own-vehicle-position calculation unit according to the embodiment.

Here, as shown in FIG. 5, assuming at a time t as follows: an own-vehicle position in a latitudinal direction and a longitudinal direction as $x(t)$, $y(t)$, a vehicle rotation angle as $\theta(t)$, a vehicle speed as $v(t)$ in a travel direction, and a rotation angular speed as $w(t)$, wherein these are state quantities; $\Delta t$ as an update time; and $\hat{X}(t)$ as a predictive value at the time t, the calculation of the predictive value is expressed as an equation 1 below:

$$\begin{bmatrix} \hat{x}(t) \\ \hat{y}(t) \\ \hat{\theta}(t) \\ \hat{v}(t) \\ \hat{w}(t) \end{bmatrix} = \begin{bmatrix} x(t-1) \\ y(t-1) \\ \theta(t-1) \\ v(t-1) \\ w(t-1) \end{bmatrix} + \begin{bmatrix} v(t-1)*\cos\theta(t-1) \\ v(t-1)*\sin\theta(t-1) \\ w(t) \\ 0 \\ 0 \end{bmatrix} \Delta t, \text{ and}$$

$$\hat{X}(t) = g(X(t-1)),$$

Equation 1.

Because the equation 1 is non-linear, it is developed by a Tailor development and is linearized; then it is expressed as an equation 2 below:

Equation 2.

$$\hat{X}(t) = g(\hat{X}(t-1)) + G(t)(X(t-1) - \hat{X}(t-1)), \text{ and}$$

$$G(t) = \left.\frac{\partial g(X)}{\partial X}\right|_{X=\hat{X}(t)} = \begin{bmatrix} 1 & 0 & -\hat{v}(t)\Delta t*\sin\hat{\theta}(t) & \Delta t*\cos\hat{\theta}(t) & 0 \\ 0 & 1 & \hat{v}(t)*\cos\hat{\theta}(t) & \Delta t*\sin\hat{\theta}(t) & 0 \\ 0 & 0 & 1 & 0 & 1 \\ 0 & 0 & 0 & 0 & 0 \\ 0 & 0 & 0 & 0 & 0 \end{bmatrix},$$

Then, it is possible to obtain the error variance $\hat{\Sigma}(t)$ of the predictive value from an equation 3 below:

$$\hat{\Sigma}(t) = G(t)\Sigma(t-1)G(t)^T, \text{ and}$$

Equation 3.

$$\Sigma(0) = \begin{bmatrix} \sigma x & 0 & 0 & 0 & 0 \\ 0 & \sigma y & 0 & 0 & 0 \\ 0 & 0 & \sigma\theta & 0 & 0 \\ 0 & 0 & 0 & \sigma v & 0 \\ 0 & 0 & 0 & 0 & \sigma w \end{bmatrix},$$

A superscript T on the right upside of the matrix in the first equation of the equation 3 expresses a transpose matrix. In addition, the default $\Sigma(0)$ of the error covariance matrix is assumed to be a matrix composed only of a diagonal component.

Next, the own-vehicle-position calculation unit 110 calculates an update, using an observed value at the time t (step S402).

It is assumed that; the latitude and longitude of the own-vehicle position that are positioned value at the time t obtained from the GPS receiver 21 are $xg(t)$, $yg(t)$; a vehicle travel speed in a travel direction is $vg(t)$; a vehicle azimuth is $\theta(t)$; a vehicle angular speed detected by the angular speed sensor 22 is $wj(t)$; a vehicle travel speed detected by the vehicle speed sensor 23 in the travel direction is $vp(t)$; and an observation vector is $Y(t)$. Then an update processing based on the observation is expressed as an equation 4 below:

Equation 4.

$$\begin{bmatrix} vp(t) \\ wj(t) \\ xg(t) \\ yg(t) \\ vg(t) \\ \theta g(t) \end{bmatrix} = \begin{bmatrix} 0 & 0 & 0 & 1 & 0 \\ 0 & 0 & 0 & 0 & 1 \\ 1 & 0 & 0 & 0 & 0 \\ 0 & 1 & 0 & 0 & 0 \\ 0 & 0 & 0 & 1 & 0 \\ 0 & 0 & 1 & 0 & 0 \end{bmatrix} X(t) + \begin{bmatrix} \sigma vp & 0 & 0 & 0 & 0 & 0 \\ 0 & \sigma wj & 0 & 0 & 0 & 0 \\ 0 & 0 & \sigma xg & 0 & 0 & 0 \\ 0 & 0 & 0 & \sigma yg & 0 & 0 \\ 0 & 0 & 0 & 0 & \sigma vg & 0 \\ 0 & 0 & 0 & 0 & 0 & \sigma\theta p \end{bmatrix},$$

and $\hat{Y}(t) = H(t)X(t) + Q(t)$, where $Q(t)$ is the standard deviation of an observation error corresponding to each observation vector, Using the equations 1 to 4 thus described, the Kalman filter is set (step S403). Assuming that a Kalman gain is $K(t)$, it is expressed as an equation 5:

$K(t) = \hat{\Sigma}(t)H(t)^T(H(t)\hat{\Sigma}(t)H(t)^T)$, $X(t) = \hat{X}(t) + K(t)(Y(t) - \hat{Y}(t))$, and $\Sigma(t) = (I - K(t)H(t))\hat{\Sigma}(t)$, where $I$ is an identity matrix,    Equation 5.

According to such a prediction processing and an update processing, it is possible to calculate the state vector $X(t)$ and its error covariance matrix $\Sigma(t)$. Information to transfer to the map-matching control unit 120 is, as expressed in an equation 6 below: $x(t)$, $y(t)$ of an own-vehicle absolute position $Xc(t)$; and an variance $\sigma xx(t)$ of $x(t)$, an variance $\sigma yy(t)$ of $y(t)$, and a covariance $\sigma xy(t)$ between $x(t)$ and $y(t)$, included in an error covariance matrix $\Sigma c(t)$. The own-vehicle absolute position $Xc(t)$ and the error covariance matrix $\Sigma c(t)$ are things where components relating to the position $x(t)$, $y(t)$ at the time t are extracted from the state vector $X(t)$ and its error covariance matrix $\Sigma c(t)$ calculated at the time t by the Kalman filter.

$$Xc(t) = \begin{bmatrix} x(t) \\ y(t) \end{bmatrix}, \text{ and}$$

Equation 6.

$$\Sigma c(t) = \begin{bmatrix} \sigma xx(t) & \sigma xy(t) \\ \sigma xx(t) & \sigma yy(t) \end{bmatrix},$$

According to this calculation processing, the own-vehicle-position calculation unit 110 can acquire the own-vehicle absolute position $Xc(t)$ and its error covariance matrix $\Sigma c(t)$ at the time t (step S404).

Next will be described the map-matching processing by the map-matching control unit 120 in the step S302 of FIG. 3.

Figure 6:
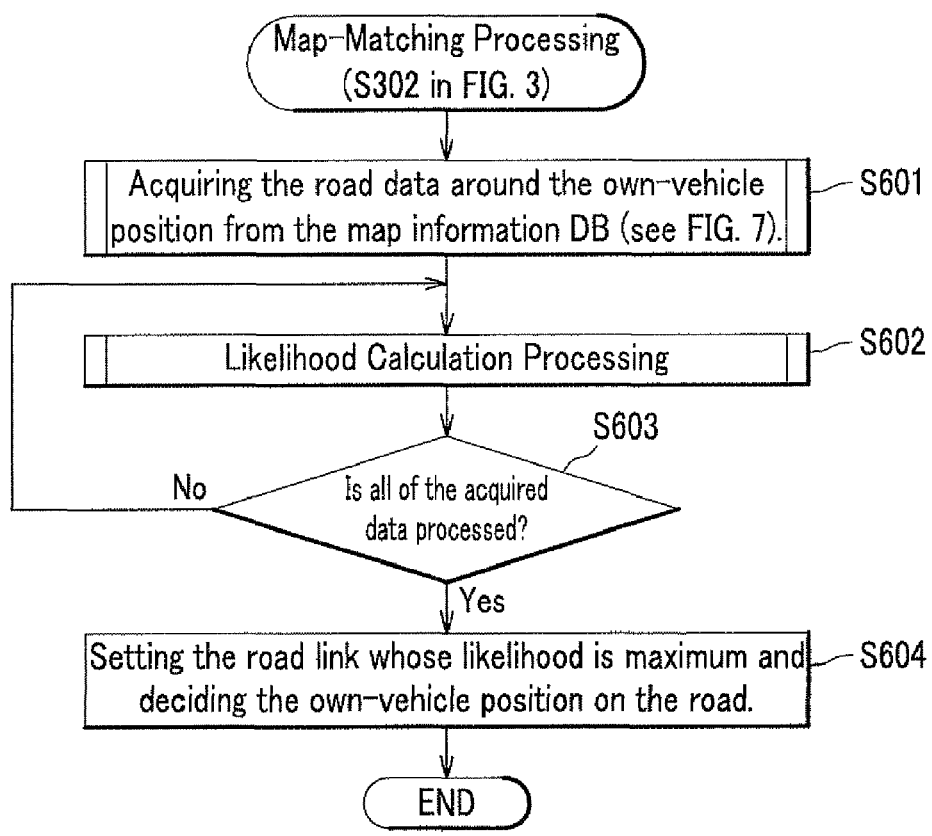
FIG. 6 is a flowchart showing an operation procedure of a map-matching processing performed by a map-matching control unit according to the embodiment.

FIG. 6 is a flowchart showing the operation procedure of the map-matching processing performed by the map-matching control unit 120 according to the embodiment.

The map-matching processing is a processing for deciding a most likely own-vehicle position on a road link by using the own-vehicle absolute position Xc(t) and its error covariance matrix at the time t calculated by the own-vehicle-position calculation unit 110.

Firstly, the map data acquisition unit 121 in the map-matching control unit 120 decides a map range, where road data is acquired, from the own-vehicle position and its error covariance matrix calculated by the own-vehicle-position calculation unit 110, and acquires the road data around the own-vehicle position from the map information DB 600 (step S601). In addition, the road data acquisition processing will be described later in detail with reference to FIG. 7.

Next, the map-matching candidate calculation unit 122 in the map-matching control unit 120 selects one of the road data acquired in the step S601, and calculates the likelihood of the selected road data from the information of the own-vehicle position and its error covariance matrix (step S602).

In addition, this likelihood calculation processing will be described later in detail in examples 1 to 4 with respect to the processing described later.

Subsequently, the map-matching candidate calculation unit 122 determines whether or not the likelihood calculation processing is finished with respect to all of the acquired road data (step S603). Here, when there is any road data whose likelihood calculation processing is not finished (No in the step S603), the map-matching candidate calculation unit 122 returns to the step S602 and continues the processing. On one hand, when the likelihood calculation processing is finished with respect to all of the acquired road data (Yes in the step S603), the map-matching candidate calculation unit 122 proceeds to the next step S604.

In the step S604, the maximum likelihood selection unit 123 in the map-matching control unit 120 compares all of the likelihoods calculated by the map-matching candidate calculation unit 122 in the step S602, selects a road link whose likelihood is maximum, and decides the own-vehicle position on the road (step S604). Then the maximum likelihood selection unit 123 memorizes the information relating to the own-vehicle position, and the road link, whose likelihood is maximum, in the own-vehicle-position information 700 of the memory unit 70 (see FIG. 18 described later).

Thus the position detection apparatus 1 can select a point whose likelihood is maximum on the road link as the own-vehicle position on the road according to the map-matching processing by the map-matching control unit 120.

<Road Data Acquisition Processing>

Next will be described a road data acquisition processing performed by the map data acquisition unit 121 in the map-matching control unit 120 with reference to FIG. 7.

Figure 7:
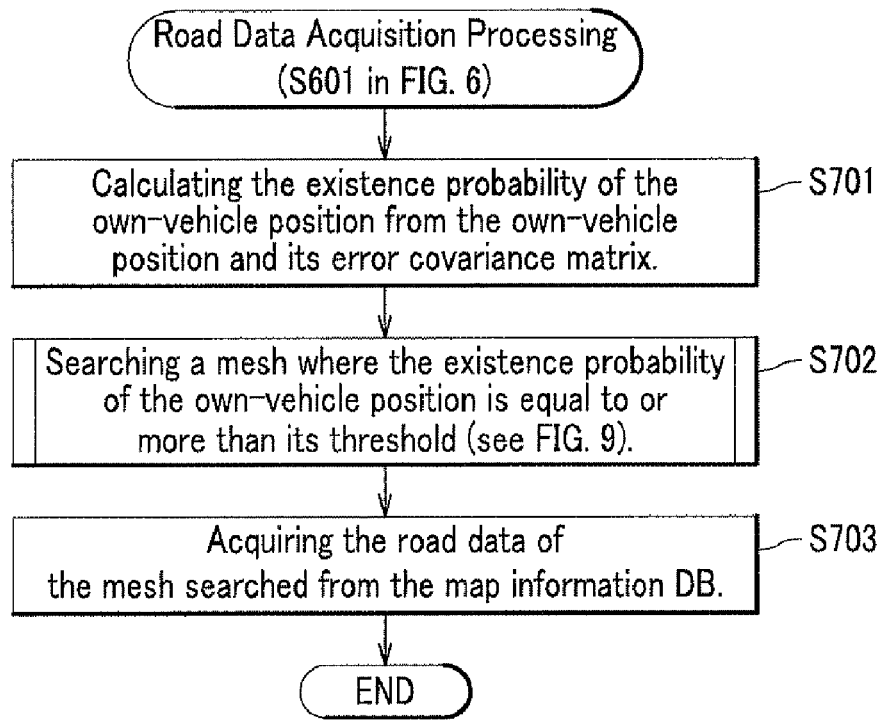
FIG. 7 is a flowchart showing an operation procedure of a road data acquisition processing performed by a map data acquisition unit according to the embodiment.

FIG. 7 is a flowchart showing the operation procedure of the road data acquisition processing performed by the map data acquisition unit 121 according to the embodiment.

Firstly, the map data acquisition unit 121 calculates an existence probability of the own-vehicle position from the position and its error covariance matrix calculated by the own-vehicle-position calculation unit 110 (step S701).

Specifically, the map data acquisition unit 121 performs the next processing.

Firstly, a long axis and short axis of an error ellipse are derived from the error covariance matrix Σc(t). This is derived from solving an eigenvalue problem of the error covariance matrix; and making a vector, where the maximum eigenvalue is obtained, the vector of the long axis, and making a vector other than that the vector of the short axis. Then the eigenvalues associated with the axes correspond to error variances, respectively, in axis directions. It is possible to solve the eigenvalue problem by solving an equation 7 below:

$$|I - \lambda \Sigma c(t)| = 0,$$ Equation 7.

Figure 8:
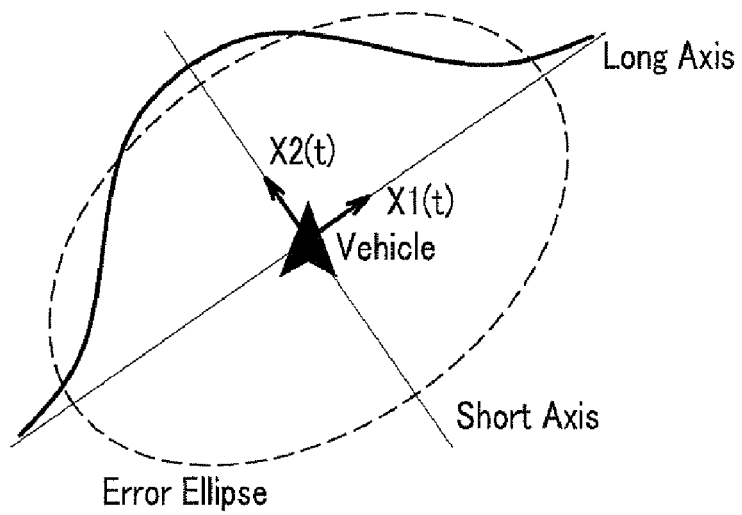
FIG. 8 is a drawing showing a relationship between an own-vehicle position and a long axis and short axis of an error ellipse according to the embodiment.

FIG. 8 is a drawing showing a relationship between an own-vehicle position and a long axis and short axis of an error ellipse according to the embodiment.

Here, it is assumed that: the vector of the long axis is X1(t); the vector of the short axis is X2(t); the eigenvalue of the long axis is "1; and the eigenvalue of the short axis is "2. Because the Kalman filter is used in the own-vehicle-position calculation unit 110, the existence probability of the own-vehicle position is a two-dimensional Gaussian distribution making the own-vehicle absolute position Xc(t) the center of the distribution. Accordingly, depending on a distance from the center of the Gaussian distribution, it is possible to decide the existence probability of the own-vehicle position. For example, when the distance from the center is equal to the standard deviation of the Gaussian distribution, the existence probability is about 68.3%; when the distance is equal to three times of the standard deviation, the existence probability is 99.7%.

Next, the map data acquisition unit 121 searches a mesh whose existence probability of the own-vehicle position is equal to or more than a threshold of the probability (step S702). This processing is a processing for reducing a number of data of road links in calculating the likelihood of the own-vehicle position from a relationship between the own-vehicle position and the road links. As the own-vehicle position becomes large, the error ellipse becomes large. According to the processing in the step S702, depending on the size of the error ellipse, the range of the mesh searched is decided, and it is possible to efficiently search the candidate of the road link. In addition, the detail of the processing in the step S702 will be described later in FIG. 9.

Next, the map data acquisition unit 121 acquires road data per mesh unit stored in the map information DB 600 of the auxiliary storage unit 60, making a mesh ID of the key, which is searched in the step S702, a key (step S703).

Thus, in addition to limiting the range of the range of the mesh to search, by acquiring the map data, it is possible to reduce the calculation load of the likelihood calculation processing in the step S602 of FIG. 6.

Next will be described the mesh search processing performed by the map data acquisition unit 121 in the step S702 of FIG. 7 with reference to FIG. 9.

Figure 9:
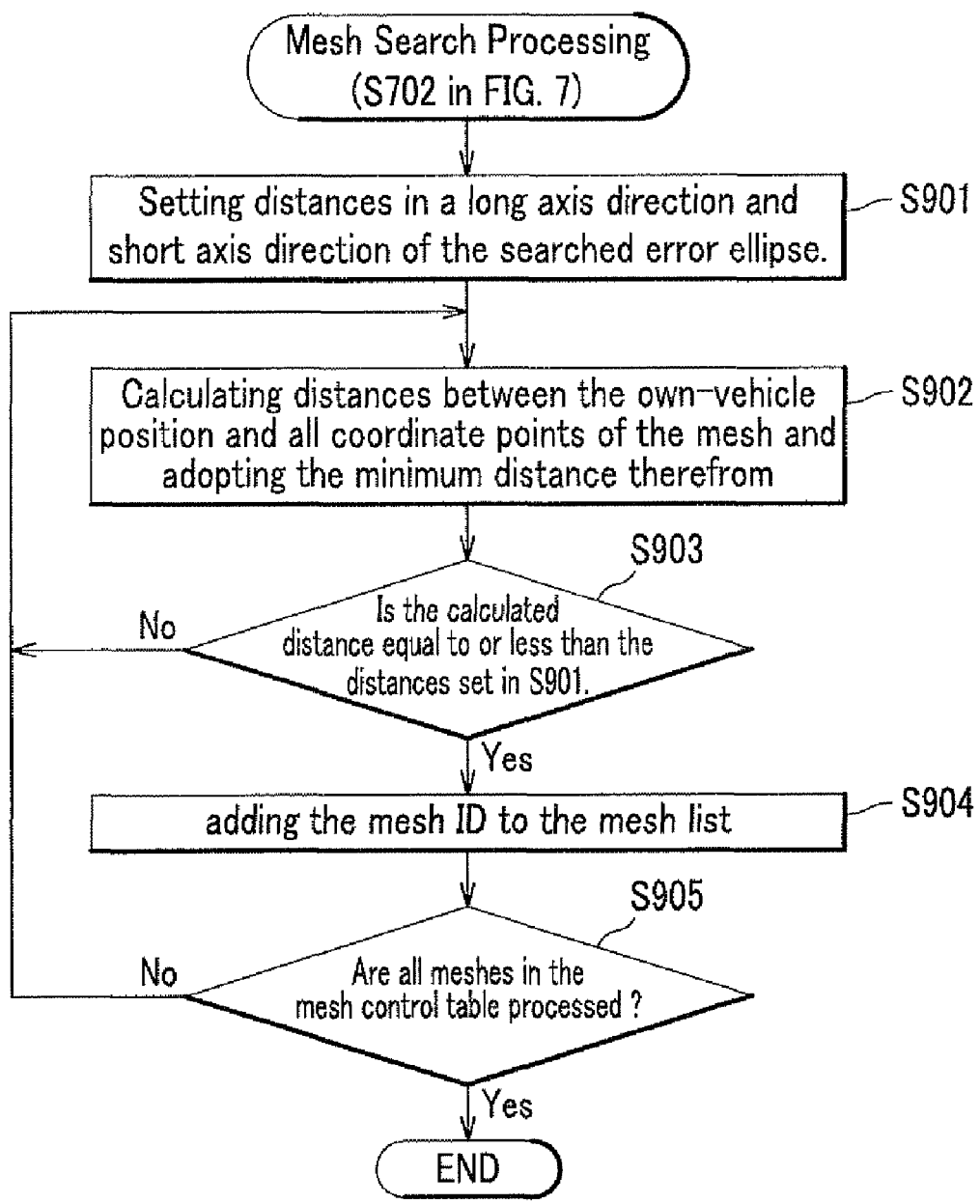
FIG. 9 is a flowchart showing an operation procedure of a mesh search processing performed by the map data acquisition unit according to the embodiment.

FIG. 9 is a flowchart showing the operation procedure of the mesh search processing performed by the map data acquisition unit 121 according to the embodiment.

As shown in FIG. 9, firstly, the map data acquisition unit 121 sets distances in the long-axis direction and short-axis direction of the error ellipse to search (step S901).

Theses distances in the long-axis direction and short-axis direction in the long-axis direction, for example, can be derived from the threshold of a probability set in advance. The distances have the Gaussian distributions of: the average value of the own-vehicle position Xc(t), and the standard deviation of $\sqrt{\lambda 1}$ in the long-axis direction; and the average value of the own-vehicle position Xc(t), and the standard deviation of $\sqrt{\lambda 2}$ in the short-axis direction.

Therefore, when the threshold of the existence probability is 99.7%, the search distances are $3\sqrt{\lambda 1}$ in the long-axis direction and $3\sqrt{\lambda 2}$ in the short-axis direction, making the own-vehicle position Xc(t) a center thereof.

Next, the map data acquisition unit map data acquisition unit 121 selects one mesh ID from a mesh control table in FIG. 2C stored in the map information DB 600 of the auxiliary storage unit 60, and derives a distance between the position coordinates of the mesh ID and the own-vehicle position Xc(t). With respect to the vertices of a mesh, there are lower left one, upper left one, lower right one, and upper right one; calculating distances of respective coordinate points therefrom, the map data acquisition unit 121 adopts the minimum distance therefrom (step S902).

Next, the map data acquisition unit 121 determines whether or not the calculated mesh distance is equal to or less than the distance set in the step S901 (step S903). Here, when the calculated mesh distance is longer than the set distance (No in the step S903), the map data acquisition unit 121 returns to the step S902, selects a next mesh ID, and continues the processing. On one hand, when the calculated mesh distance is equal to or less than the set distance (Yes in the step S903), the map data acquisition unit 121 adds the mesh ID, whose mesh distance is equal to or less than the distance set in the step S901, to a mesh list (step S904). The mesh list is a thing for memorizing the mesh ID in the memory unit 70.

Then the map data acquisition unit 121 determines whether or not all meshes in the mesh control table are processed (step S905). Here, when there is a mesh not processed yet (No in the step S905), the map data acquisition unit 121 returns to the step S902 and continues the processing. On one hand, when all meshes in the mesh control table are processed (Yes in the step S905), the mesh search processing by the map data acquisition unit 121 is finished.

Thus the map data acquisition unit 121 can acquire a mesh overlapping on the error ellipse.

<Likelihood Calculation Processing>

Next will be described a likelihood calculation processing by the map-matching candidate calculation unit 122 in the step S602 of FIG. 6.

<First Example of Likelihood Calculation Processing>

The map-matching candidate calculation unit 122 of the map-matching control unit 120 firstly projects the own-vehicle position on the road link. This projection method is a method of, for example, lowering normal from the own-vehicle position to the road link, and making an intersection between the normal and the road link the own-vehicle position on the road.

Figure 10:
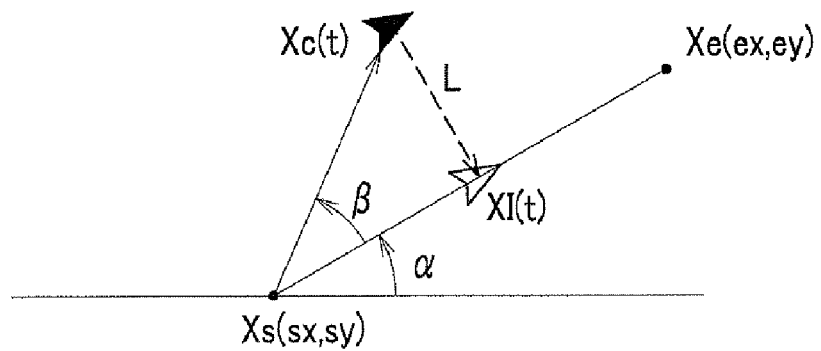
FIG. 10 is a drawing illustrating a first example of a likelihood calculation processing performed by a map-matching candidate calculation unit.

FIG. 10 is a drawing illustrating a first example of the likelihood calculation processing performed by the map-matching candidate calculation unit 120.

As shown in FIG. 10, it is assumed that: the coordinate of a start point of the road link is Xs(sx, sy); a coordinate of a finish point thereof is Xe(ex, ey); an azimuth of the road link is $\alpha$; an angle between the road link and the own-vehicle position is $\beta$; and a position vector representing the own-vehicle position on the road is X1($t$). Then it is possible to derive the own-vehicle position on the road according to an equation 8.

$$XI(t) = Xs + k(Xe - Xs),$$

$$L = \frac{(Xe - Xs) + (Xc(t) - Xs)}{|Xe - Xs|}, \text{ and}$$

$$k = \frac{L}{\tan\beta} - \frac{1}{|Xe - Xs|},$$

Equation 8.

where an operator "×," a vector product; L, a distance from the absolute position of an own vehicle to an own-vehicle position on a road; and k, a ratio of a length from the start point of a road link until the own-vehicle position on the road link to its link length. Furthermore, when there exists no normal, the start point or finish point of the road link is adopted as the position on the road, depending on which distance is shorter between the own-vehicle position and the start point or between the position and the finish point.

Then, from a distance from the own-vehicle absolute position Xc(t) to the own-vehicle position XI(t) and the error covariance matrix $\Sigma c(t)$, it is possible to calculate a Mahalanobis distance D(t) according to an equation 9 below:

$$D(t) = \sqrt{(XI(t) - Xc(t))^T \Sigma(t)^{-1} (XI(t) - Xc(t))},$$

Equation 9.

A Mahalanobis distance is a distance, where a variation of an estimated absolute position in an own vehicle is considered; the larger the distance is between an own-vehicle absolute position and an own-vehicle position on a road, and the smaller an error covariance matrix is, the shorter the Mahalanobis distance is. Therefore, the likelihood of the road link is the inverse number of the Mahalanobis distance.

Furthermore, it is also possible to express the likelihood as a probability M(t) in such an equation 10 below:

$$M(t) = \frac{1}{2\pi |\Sigma(t)|^{-1}} \exp\left(-\frac{1}{2} D(t)\right),$$

Equation 10.

The equation 10 is a probability density function of Gaussian distribution of two variables.

Thus it is possible to calculate the likelihood based on the Mahalanobis distance and that based on the probability M(t).

<Second Example of Likelihood Calculation Processing>

Next will be described a second example of the likelihood calculation processing by the map-matching candidate calculation unit 122 in the step S602 of FIG. 6.

The likelihood calculation processing according to the second example derives a Mahalanobis distance from any of a long axis and short axis of an error ellipse to an intersection of a road link; a point whose Mahalanobis distance is shortest is decided as an own-vehicle position on the road, and the likelihood of the point is made that of the own-vehicle position on the road.

Figure 11:
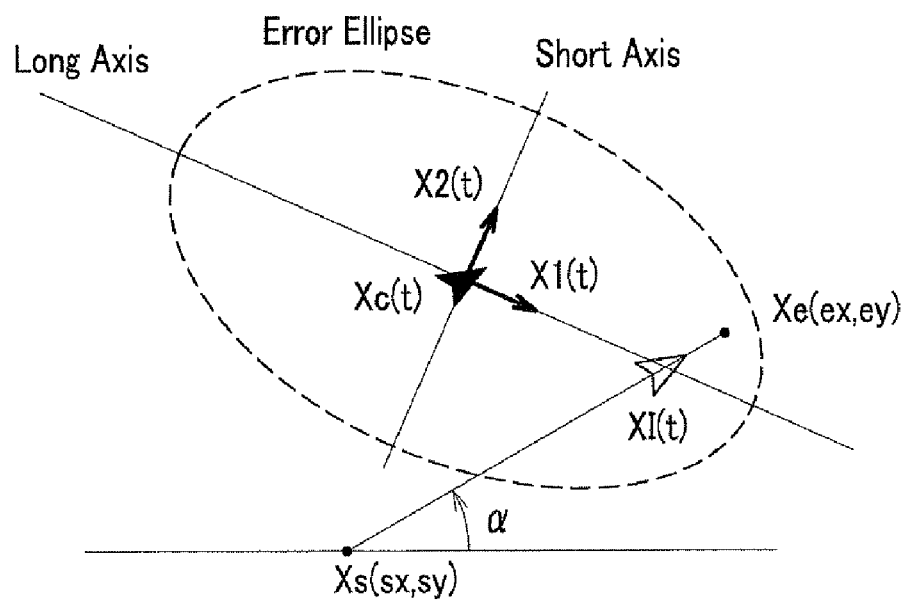
FIG. 11 is a drawing illustrating a second example of the likelihood calculation processing performed by the map-matching candidate calculation unit with using an error ellipse.

FIG. 11 is a drawing illustrating the second example of the likelihood calculation processing performed by the map-matching candidate calculation unit 122 with using an error ellipse.

As shown in FIG. 11, it is assumed that an intersection between a road link and any of a long axis and short axis of an error ellipse is the coordinate X1($t$) of an own-vehicle position on a road. Furthermore, when there exists no intersection between the road link and any of the long axis and the short axis, the start point or finish point of the road link is adopted as the position on the road, depending on a distance shorter between the own-vehicle position and the start point or between the position and the finish point.

With respect to the second example of the likelihood calculation processing, the map-matching candidate calculation unit 122 derives a coefficient k from a vector product equation of an equation 11 below, and can thereby calculate the coordinate X1($t$) of the own-vehicle position on the road.

$$XI(t) = Xc(t) + kX_{1,2}(t), \text{ and}$$

$$(XI(t) - Xs) \times (Xe - Xs) = 0,$$

Equation 11.

Figure 12:
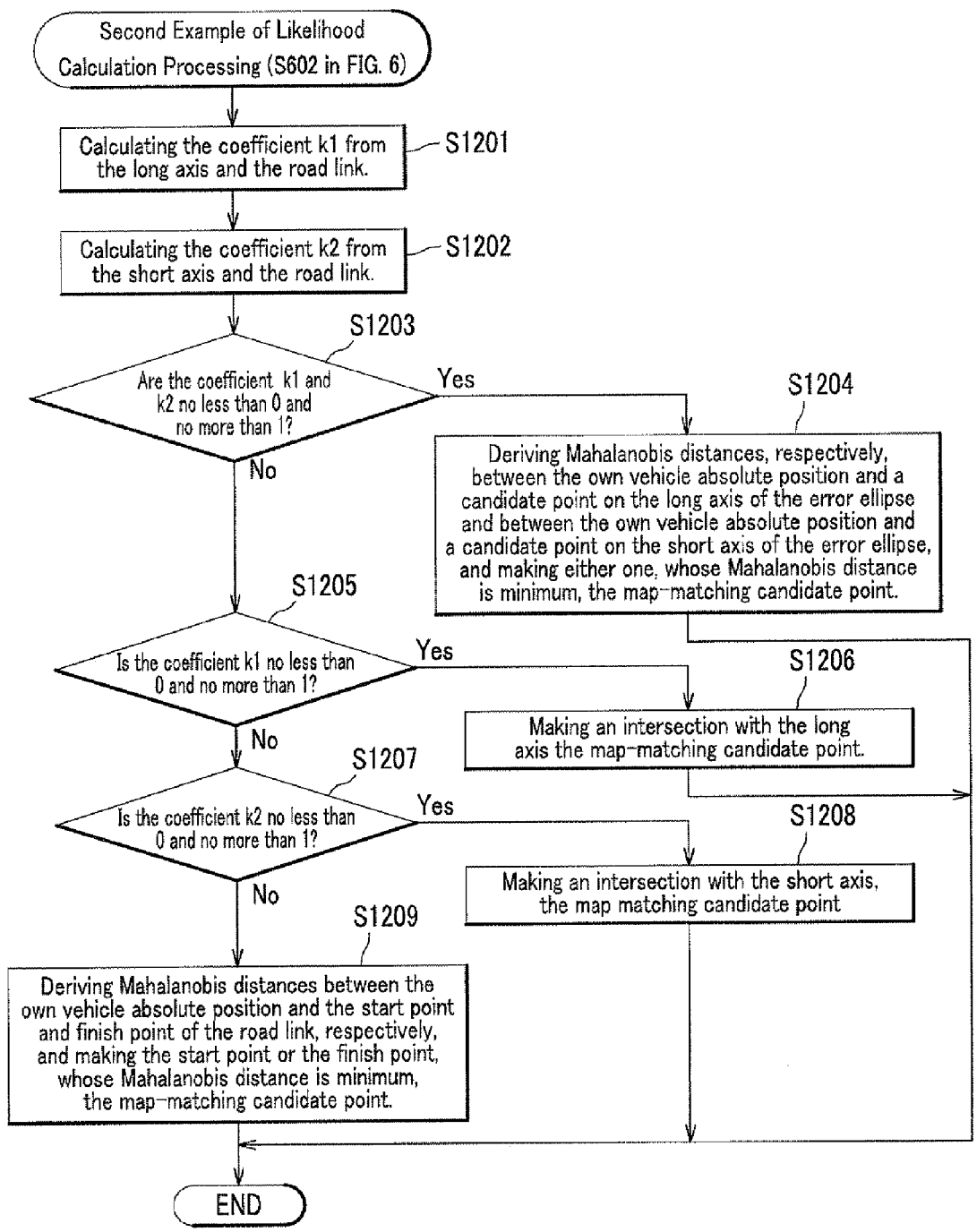
FIG. 12 is a flowchart showing an operation procedure performed by the map-matching candidate calculation unit with using the error ellipse in the second example of the likelihood calculation processing.

FIG. 12 is a flowchart showing an operation procedure performed by the map-matching candidate calculation unit 122 with using the error ellipse in the second example of the likelihood calculation processing.

Firstly, the map-matching candidate calculation unit 122 uses an equation 12 below and calculates a coefficient k1 from the coordinates of the long axis of the error ellipse and the start point and finish point of the road link (step S1201).

$$XI(t) = Xc(t) + k_1 X_1(t), \text{ and}$$

$$(XI(t) - Xs) \times (Xe - Xs) = 0, \qquad \text{Equation 12.}$$

Next, the map-matching candidate calculation unit 122 uses an equation 13 below and calculates a coefficient k2 from the coordinates of the short axis of the error ellipse and the start point and finish point of the road link (step S1202).

$$XI(t) = Xc(t) + k_2 X_2(t), \text{ and}$$

$$(XI(t) - Xs) \times (Xe - Xs) = 0, \qquad \text{Equation 13.}$$

Subsequently, the map-matching candidate calculation unit 122 uses the calculated coefficient k1, k2 and determines whether or not k1 and k2 are no less than 0 and no more than 1 (step S1203). When the coefficient k1, k2 are both no less than 0 and no more than 1 (this case means that the road link possesses intersections with the long axis and short axis of the error ellipse, respectively) (Yes in the step S1203), the map-matching candidate calculation unit 122 proceeds to a step S1204.

In the step S1204 the map-matching candidate calculation unit 122 derives Mahalanobis distances, respectively, between the own vehicle absolute position Xc(t) and a candidate point XI(t) on the long axis of the error ellipse and between the own vehicle absolute position Xc(t) and a candidate point XI(t) on the short axis of the error ellipse, and makes the candidate point XI(t), whose Mahalanobis distance is minimum, a map-matching candidate point XI(t) (step S1204).

On one hand, when the coefficient k1, k2 are both not no less than 0 and no more than 1 (No in the step S1203), the map-matching candidate calculation unit map-matching candidate calculation unit 122 proceeds to a step S1205 determines whether or not the coefficient k1 is no less than 0 and no more than 1 (step S1205).

When the coefficient k1 is no less than 0 and no more than 1 (Yes in the step S1205), the map-matching candidate calculation unit 122 makes the own-vehicle position on the road, which is an intersection with the long axis, the map-matching candidate point XI(t) (step S1206).

On one hand, when the coefficient k1 is not no less than 0 and no more than 1 (No in the step S1205), the map-matching candidate calculation unit 122 determines whether or not the coefficient k2 is no less than 0 and no more than 1 (step S1207). When the coefficient k2 is no less than 0 and no more than 1 (Yes in the step S1207), the map-matching candidate calculation unit 122 makes the own-vehicle position XI(t) on the road, which is an intersection with the short axis, the map-matching candidate point XI(t) (step S1208).

On one hand, when the coefficient k2 is not no less than 0 and no more than 1 (No in the step S1207), because there exists no intersection between the own-vehicle position and the long axis and short axis of the error ellipse, the map-matching candidate calculation unit 122 derives Mahalanobis distances between the own vehicle absolute position Xc(t) and the start point and finish point of the road link, respectively, and makes the start point or the finish point, whose Mahalanobis distance is minimum, the map-matching candidate point XI(t) (step S1209).

Thus the map-matching candidate calculation unit 122 can decide the map-matching candidate point, whose Mahalanobis distance is minimum, with respect to each road link and set the likelihood based on the Mahalanobis distance.

<Third Example of Likelihood Calculation Processing>

Next will be described a third example of the likelihood calculation processing by the map-matching candidate calculation unit 122 in the step S602 of FIG. 6.

According to the likelihood calculation processing of the third example, it is determined whether or not there exists a road link in an error ellipse; when there exists a road link in the error ellipse, a highest probability point on an existing road link in the error ellipse is decided as the own-vehicle position VI(t) on the road, and the likelihood of the point is made that of the own-vehicle position VI(t) on the road.

Figure 13A:
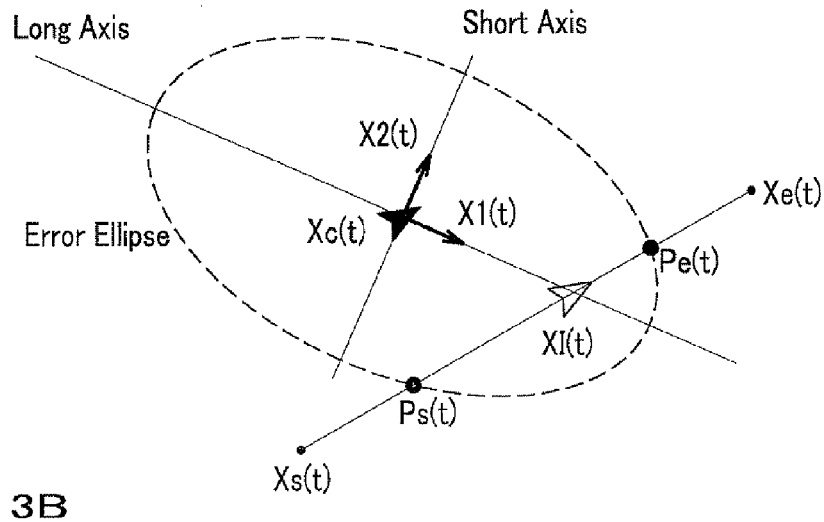
FIGS. 13A, 13B, and 13C are drawings illustrating a third example of the likelihood calculation processing performed by the map-matching candidate calculation unit with using an error ellipse.
Figure 13B:
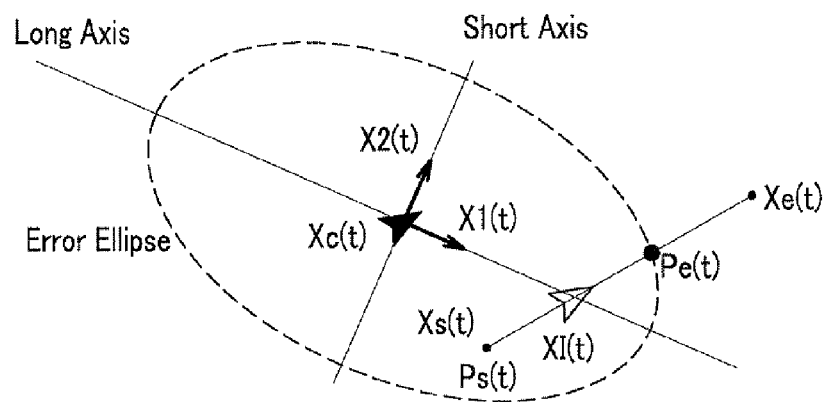
Figure 13C:
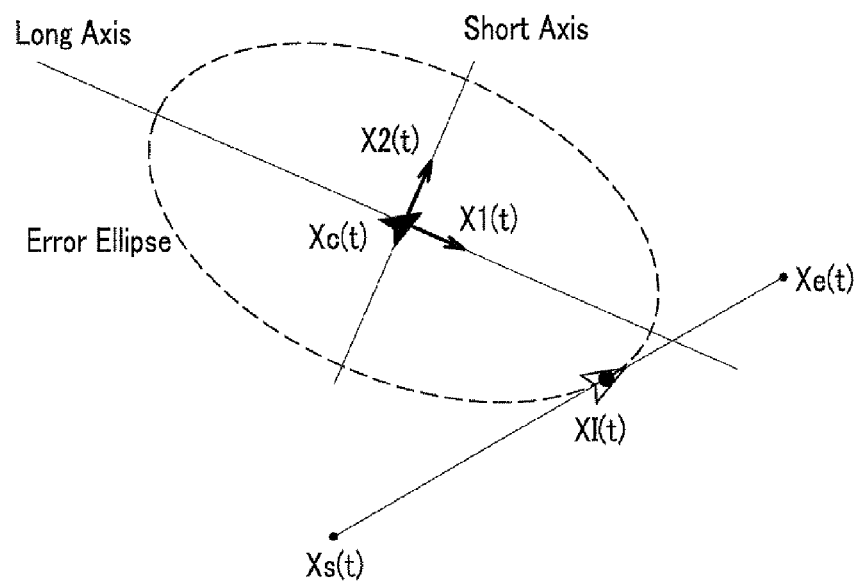

FIGS. 13A, 13B, and 13C are drawings illustrating the third example of the likelihood calculation processing performed by the map-matching candidate calculation unit 122 with using an error ellipse.

With respect to the likelihood calculation processing is firstly derived an intersection between an error ellipse and a selected road link. Here, it is assumed that lengths of the long axis and short axis of the error ellipse are three times of their standard deviations, respectively; then the existence probability is 99.7%.

FIG. 13A shows that there exist two intersections between an error ellipse and a road link. Here, it is assumed that a coordinate of an intersection on a start point side of the road link is Ps(t) and that of an intersection on a finish point side of the road link is Pe(t).

FIG. 13B shows a case where one node of a road link is included in the error ellipse. When a start point side is included in the error ellipse, the coordinate Ps(t) of the intersection at the start point side is the same as Xs(t). Furthermore, a case of a finish point side being included in the error ellipse is also similar.

FIG. 13C shows is a case where the error ellipse and a straight line contact. In this case, because the highest point in existence probability is a contact point, it is an own-vehicle position on a road.

After deriving the coordinate of the intersection, the map-matching candidate calculation unit 122 proceeds points from Ps(t) to Pe(t) along the road link and decides an intersection whose existence probability is maximum according to an equation 14.

$$XI(t) = Pk(t, k\_max), \qquad \text{Equation 14.}$$

$$Mk(t, k\_max) = \max_k (Mk(t, k),$$

$$Mk(t, k) = \frac{1}{2\pi |\Sigma(t)|_{-1}} \exp\left(-\frac{1}{2} D(t, k)\right),$$

$$Dk(t, k) = (Pk(t, k) - Xc(t))^T \Sigma(t)^{-1} (Pk(t, k) - Xc(t)),$$

and $$Pk(t, k) = Ps(t) + k(Pe(t) - Ps(t)),$$

where $Pk(t)$ is a candidate point existing on a segment whose start point is $Ps(t)$, and whose finish point is $Pe(t)$, By updating a coefficient k from 0 to 1, for example, by an increment of 0.1, it is possible to obtain eleven candidates. By selecting a coefficient k_max through which Mk(t, k) is maximum with respect to all of the coefficient k, it is possible to decide the own-vehicle position XI(t) on the road.

Figure 14:
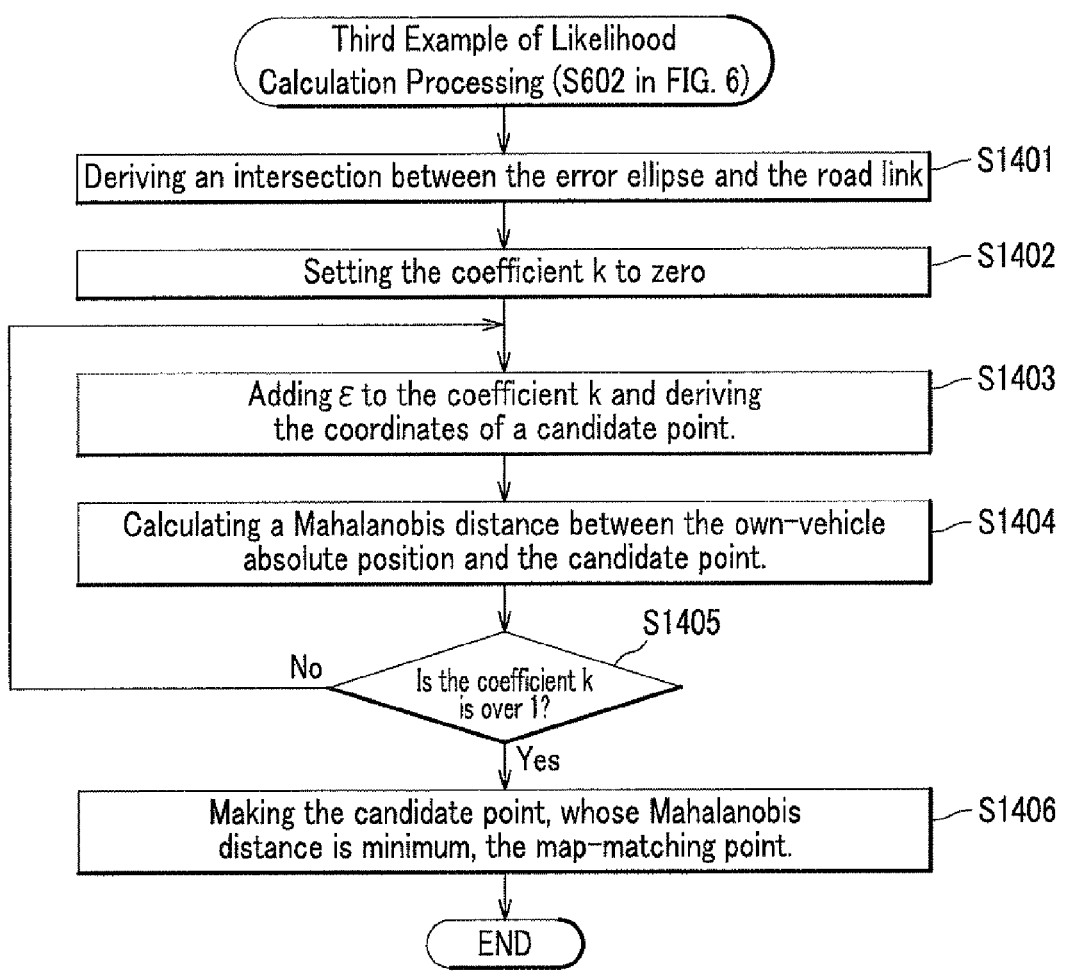
FIG. 14 is a flowchart showing an operation procedure performed by the map-matching candidate calculation unit with using the error ellipse in the third example of the likelihood calculation processing.

FIG. 14 is a flowchart showing an operation procedure performed by the map-matching candidate calculation unit 122 with using the error ellipse in the third example of the likelihood calculation processing.

Firstly, the map-matching candidate calculation unit 122 derives an intersection between the error ellipse and the road link (step S1401).

Next, the map-matching candidate calculation unit 122 set the coefficient k in the equation 14 to zero (step S1402).

Subsequently, the map-matching candidate calculation unit 122 adds a predetermined numeric value $\epsilon(<1)$ to the coefficient k and derives the coordinate of a candidate point according to the equation 14 (step S1403).

Then map-matching candidate calculation unit 122 calculates a Mahalanobis distance between the own-vehicle absolute position Xc(t) and the candidate point (step S1404).

Then the map-matching candidate calculation unit 122 determines whether or not the coefficient k is over 1 (step S1405). Then when the coefficient k is not over 1, the map-matching candidate calculation unit 122 returns to the step S1403 and continues the processing. On one hand, when the coefficient k is over 1 (Yes in the step S1405), the map-matching candidate calculation unit 122 proceeds to the next step S1406.

Then in the step S1406 the map-matching candidate calculation unit 122 makes a candidate point, whose Mahalanobis distance is minimum out of each candidate point derived in the steps S1401 to S1405, a map-matching point (step S1406).

Thus the map-matching candidate calculation unit 122 can decide the map-matching point, whose Mahalanobis distance is minimum, and set the likelihood based on the minimum Mahalanobis distance.

<Fourth Example of Likelihood Calculation Processing>

Next will be described a fourth example of the likelihood calculation processing by the map-matching candidate calculation unit 122 in the step S602 of FIG. 6.

The likelihood calculation processing according to the fourth example derives a width Xw of the road link from vehicle lane information of the road link and information of a road classification, and decides an own-vehicle position on the road from the road link and, the width Xw, and information of an own-vehicle absolute position. It is possible to derive the width Xw of the road link as a product of a road width per lane and a number of lanes obtained from the lane information of the road link by defining in advance, for example, the road width per lane according to the road classification.

Figure 15A:
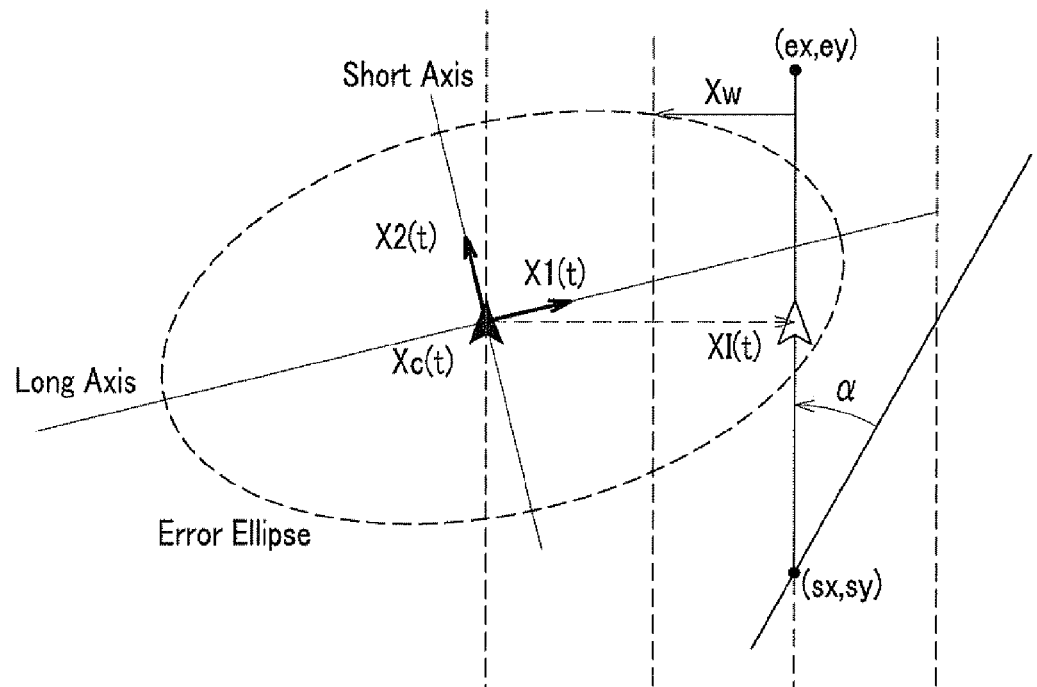
FIGS. 15A and 15B are drawings illustrating a fourth example of the likelihood calculation processing performed by the map-matching candidate calculation unit with using an error ellipse.
Figure 15B:
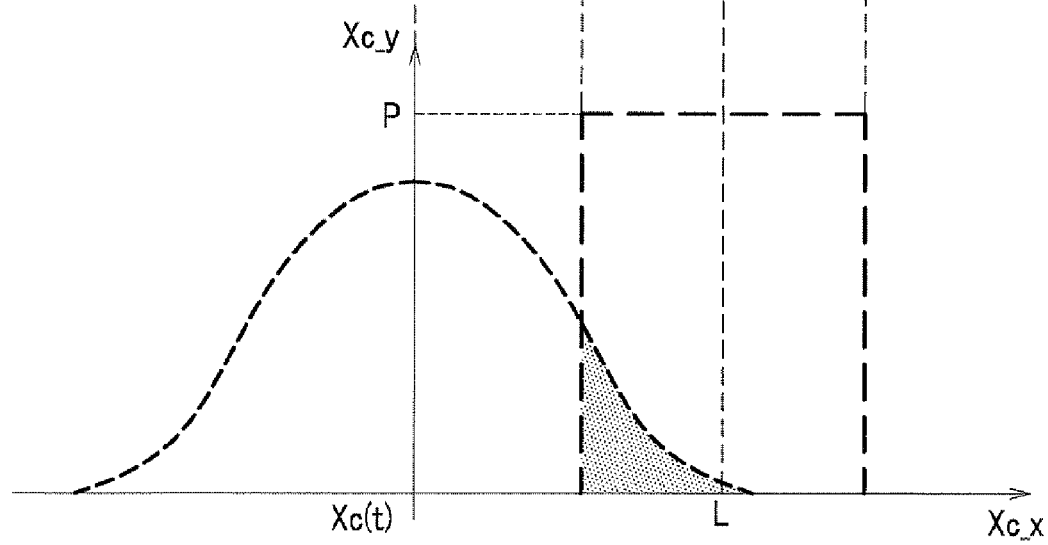

FIGS. 15A and 15B are drawings illustrating the fourth example of the likelihood calculation processing performed by the map-matching candidate calculation unit 122 with using an error ellipse.

FIG. 15A shows a map-matching processing in a case where a point at the foot of a normal dropped from the own-vehicle absolute position Xc(t) to a road link, is assumed to be the own-vehicle position XI(t), and a road link width is assumed to be Xw.

As shown in FIG. 15B, the own-vehicle absolute position Xc(t) is made the center of the error ellipse, an Xc_x axis is taken in a normal direction of the road link, and an Xc_y axis is taken parallel to the road link. The error ellipse takes a Gaussian distribution, making the own-vehicle absolute position Xc(t) the center of the distribution. A distance from Xc(t) to the point at the foot of the normal is assumed to be L. A distribution function of the road link is defined like an equation 15 below:

$$Xc\_y = \begin{cases} 0 & (Xc\_x < L - Xw) \\ P & (L - Xw \leq Xc\_x \leq L + Xw) \\ 0 & (Xc\_x > L + Xw), \end{cases} \quad \text{Equation 15.}$$

where $P$ takes a constant value with respect to distribution functions of all road links, Then, the likelihood is assumed to be a volume or an area where the distribution function of the own-vehicle absolute position Xc(t) and that of the road link intersect.

Figure 16:
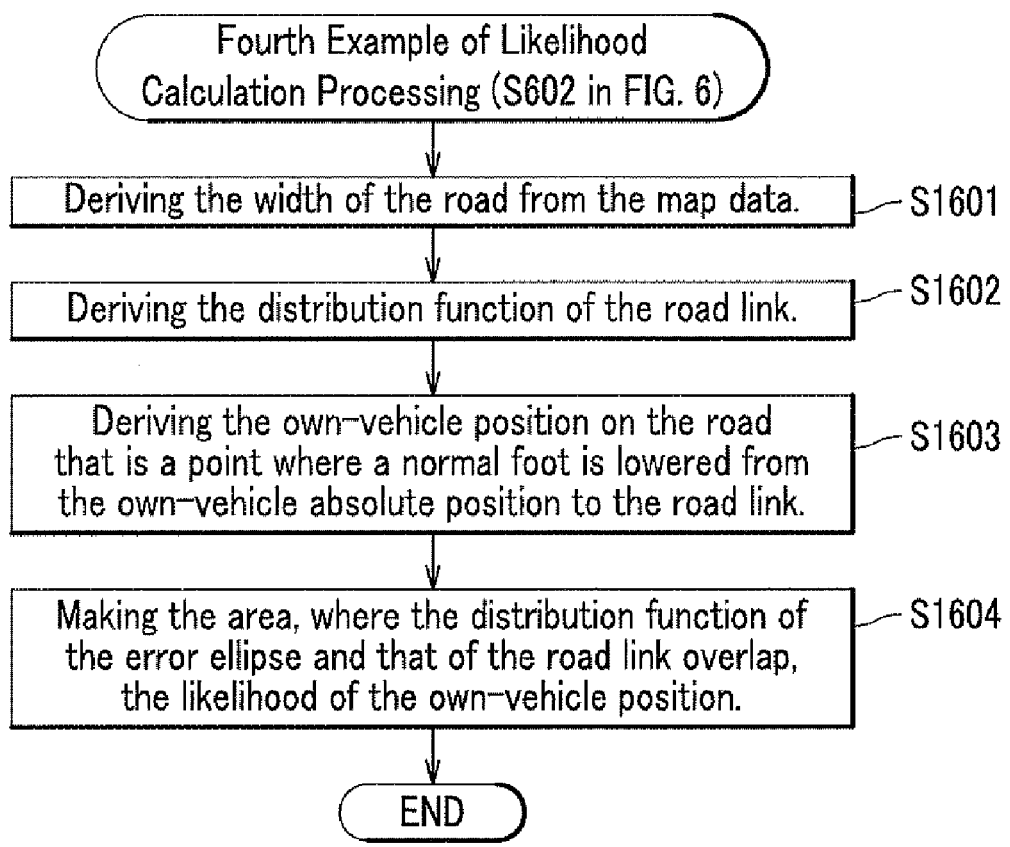
FIG. 16 is a flowchart showing an operation procedure performed by the map-matching candidate calculation unit with using the error ellipse in the fourth example of the likelihood calculation processing.

FIG. 16 is a flowchart showing an operation procedure performed by the map-matching candidate calculation unit 122 with using the error ellipse in the fourth example of the likelihood calculation processing.

Firstly, the map-matching candidate calculation unit 122 derives the width Xw of the road from the map data stored in the map information DB 600 (step S1601).

Next, the map-matching candidate calculation unit 122 derives the distribution function of the road link from the width Xw derived in the step S1601 (step S1602).

Subsequently, the map-matching candidate calculation unit 122 derives the own-vehicle position XI(t) on the road that is the point at the foot of the normal dropped from the own-vehicle absolute position Xc(t) to the road link (step S1603).

Then the map-matching candidate calculation unit 122 derives an area where the distribution function of the error ellipse and that of the road link overlap, and makes the area the likelihood of the own-vehicle position XI(t) (S1604).

It is possible to calculate the area by deriving an intersection between the Gaussian distribution of the error ellipse and the distribution function of the road link.

<Variation of Fourth Example of Likelihood Calculation Processing>

Figure 17A:
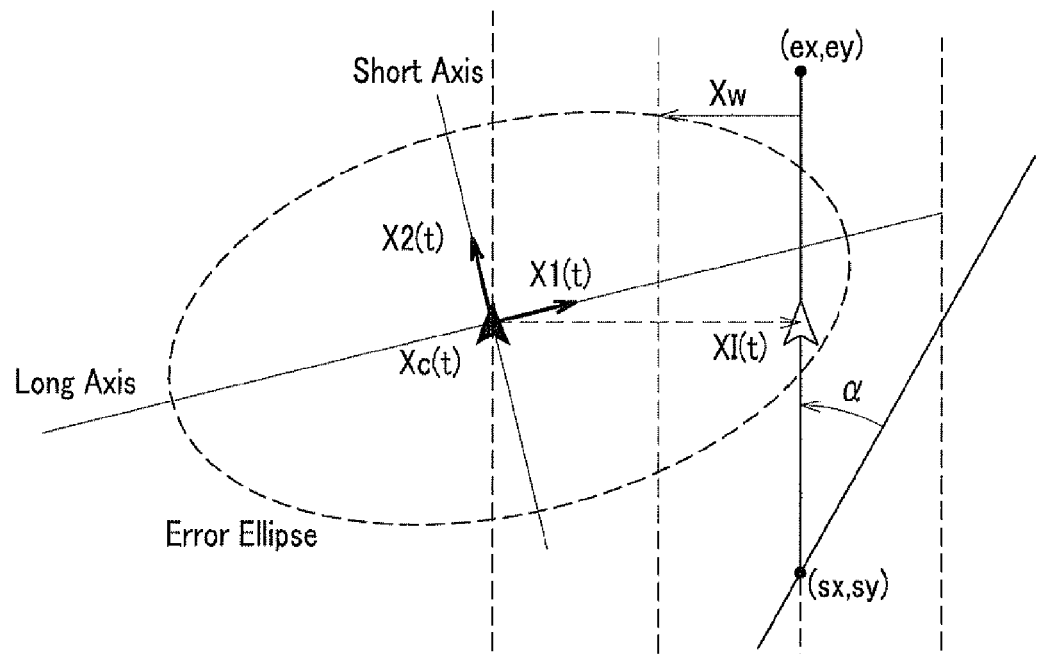
FIGS. 17A and 17B are drawings illustrating a variation of the fourth example of the likelihood calculation processing performed by the map-matching candidate calculation unit with using the error ellipse.
Figure 17B:
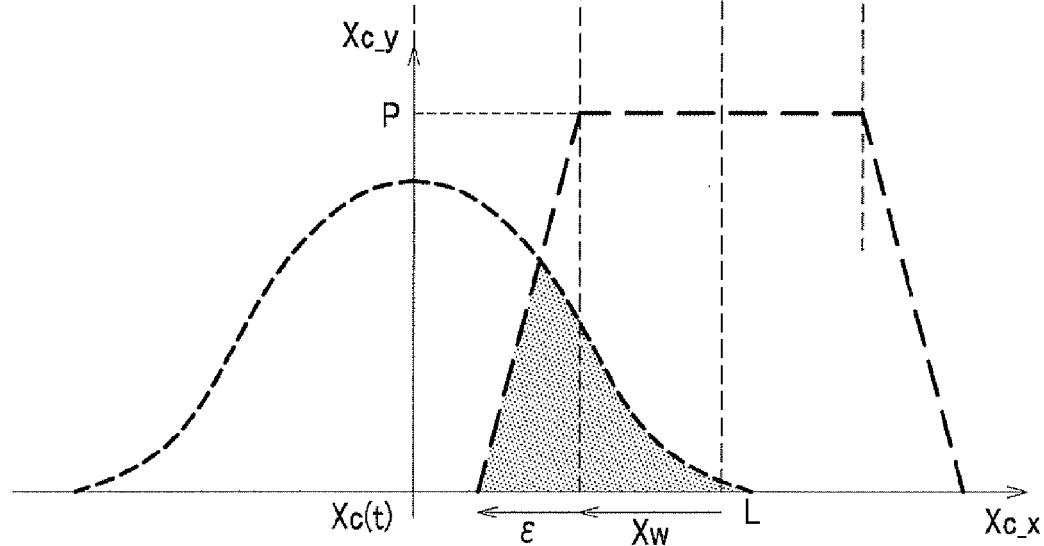

Furthermore, when an error is included in map information, as shown in FIG. 17, an error of distribution function of a road may be considered in the likelihood calculation processing. FIGS. 17A and 17B are drawings illustrating a variation of the fourth example of the likelihood calculation processing performed by the map-matching candidate calculation unit 122 with using the error ellipse.

FIG. 17A shows a map-matching processing in a case where a point, at the foot of a normal dropped from the own-vehicle absolute position Xc(t) to a road link, is assumed to be the own-vehicle position XI(t), and a road link width is assumed to be Xw.

As shown in FIG. 17B, the own-vehicle absolute position Xc(t) is made a center, an Xc_x axis is taken in a normal direction of the road link, and an Xc_y axis is taken parallel to the road link. The error ellipse takes a Gaussian distribution, making the own-vehicle absolute position Xc(t) the center of the distribution. A distance from Xc(t) to the point at the foot of the normal is assumed to be L. In this case the distribution function of the road link is like an equation 16 below:

Equation 16.

$$Xc\_y = \begin{cases} 0 & (Xc\_x < L - Xw - \varepsilon) \\ \dfrac{P}{\varepsilon}Xc\_x - \dfrac{(L - Xw - \varepsilon)}{\varepsilon}P & (L - Xw - \varepsilon \leq Xc\_x \leq L - Xw) \\ P & (L - Xw \leq Xc\_x \leq L + Xw) \\ \dfrac{P}{\varepsilon}Xc\_x + \dfrac{(L + Xw + \varepsilon)}{\varepsilon}P & (L + Xw \leq Xc\_x \leq L + Xw + \varepsilon) \\ 0 & (Xc\_x > L + Xw + \varepsilon), \end{cases}$$

The map-matching candidate calculation unit 122 performs a processing similar to the operation procedure of the likelihood calculation processing in FIG. 16, derives an overlapping area between the distribution function of the own-vehicle position Xc(t) and that of the road link, and makes the area the likelihood of the own-vehicle position XI(t).

In addition, other than the equation 16, the distribution function of the road link may also be a Gaussian distribution that makes the road link a center thereof. Furthermore, also when the own-vehicle position XI(t) on a candidate road is made an intersection between the road link and a long axis and short axis of the error ellipse, it is possible to similarly calculate the likelihood of the own-vehicle position XI(t) by using the equation 11.

<Maximum Likelihood Selection Processing>

Returning to FIG. 6, the maximum likelihood selection unit 123 compares in the step S604 every likelihood calculated with respect to each road link in the step S602, and selects a map-matching candidate point of a road link whose likelihood is maximum as the own-vehicle position XI(t) on the road. Then the maximum likelihood selection unit 123 memorizes information of the own-vehicle position XI(t) and that of the road link whose likelihood is maximum in the own-vehicle-position information 700 of the memory unit 70.

FIG. 18 is a drawing showing the data configuration of own-vehicle position information 700 according to the embodiment.

The own-vehicle-position information 700 memorizes information of the own-vehicle position XI(t) on a road calculated by the map-matching control unit map-matching control unit 120.

As shown in FIG. 18, in the own-vehicle-position information 700 are stored the latitude and longitude of the own-vehicle position XI(t) (own-vehicle absolute position Xc(t)), standard deviations in the long axis direction and short axis direction of an error ellipse, and an angle from the absolute coordinate of the long axis calculated by the own-vehicle-position calculation unit 110 before a map-matching processing; and the mesh ID and link ID of a road link, the coordinates of a start point and finish point thereof, a link length, a distance from the start point to the own-vehicle position XI(t) on the road, and the likelihood of the position XI(t) calculated by the map-matching control unit 120.

Then the information of the own-vehicle-position information 700 is used for information relating to the own-vehicle position XI(t) on a road requested for route guidance, the acquisition of traffic information, the search of a vicinity establishment, and the like.

Returning to FIG. 3, when the map-matching control unit 120 finishes the map-matching processing in the step S302, the display control unit 130 uses the own-vehicle-position information 700 memorized in the memory unit 70 and acquires the own-vehicle position, and displays the own-vehicle position by a car mark and the like together with the map information DB 600 stored in the auxiliary storage unit 60 (step S303).

Figure 19:
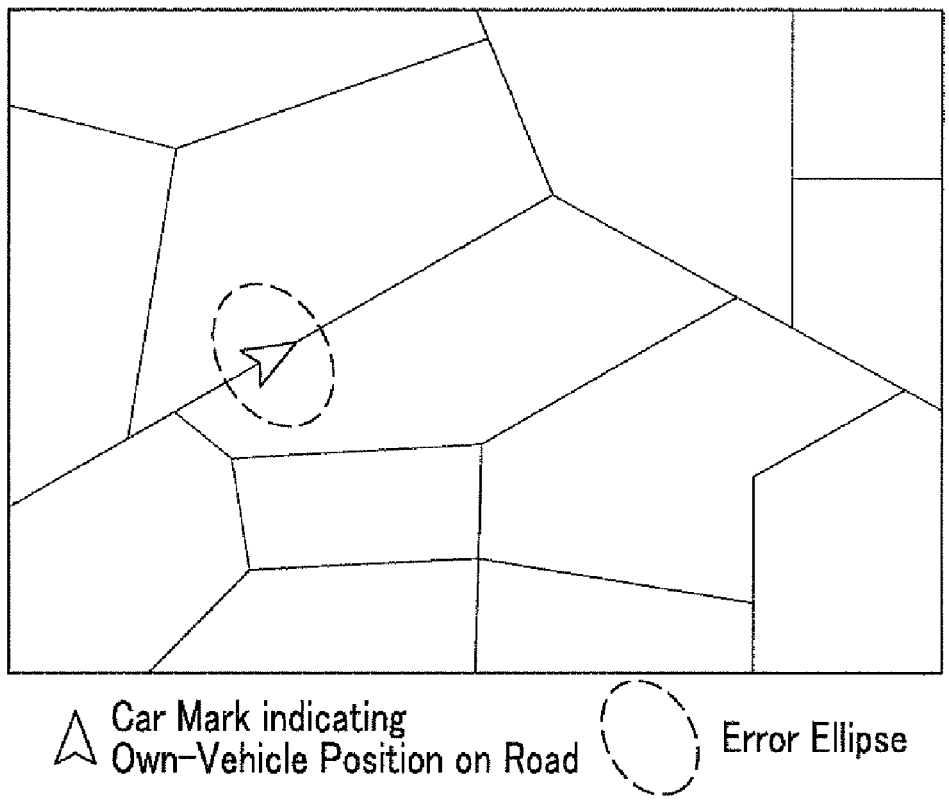
FIG. 19 is a drawing showing an example where a display control unit according to the embodiment displays an own-vehicle position on a road in a display unit.

FIG. 19 is a drawing showing an example where the display control unit 130 according to the embodiment displays the own-vehicle position XI(t) on a road in the display unit 30. As shown in FIG. 19, the display control unit 130 displays road link IDs stored in the own-vehicle-position information 700, and a car mark on a road according to a distance from the start point of road link of the road. Furthermore, it is possible to display an error ellipse, making the car mark the center of the ellipse.

Thus the position detection apparatus 1 and the position detection program according to the embodiment calculates an own-vehicle position and an error variance thereof, based on information from the detection unit 20 including the GPS receiver 21, the angular speed sensor 22, and the vehicle sensor 23; and using the calculated own-vehicle position and error variance, and the map data stored in the map information DB 600 and performs the map-matching processing. Then out of the map-matching candidate point of each road data where the map-matching processing is performed, it is possible to select the candidate point maximum in its likelihood as the own-vehicle position XI(t) on a road and to display the point in the display unit 30. Thus, upon considering the error of the own-vehicle position XI(t) generated from a sensor error, it is possible to perform a more accurate map-matching processing

What is claimed is:

1. A position detection apparatus comprising:
    a storage unit configured to store map information including road information;
    a detection unit configured to detect information for calculating an absolute position of a moving object;
    a position calculation unit configured to calculate the absolute position of the moving object and an error variance relating to an error of the moving object from the information detected by the detection unit;
    a read-out unit configured to read out from the storage unit the road information of a road relating to the absolute position calculated by the position calculation unit;
    an existence probability calculation unit configured to calculate an existence probability of the moving object existing on the road from the absolute position and the error variance calculated by the position calculation unit, and the road information read out by the read-out unit;
    a selection unit configured to select a position whose existence probability is maximum out of the existence probability calculated by the existence probability calculation unit; and
    a map-matching processing unit configured to make the position selected by the selection unit a position of the moving object on the road.

2. The position detection apparatus according to claim 1, wherein the position calculation unit comprises an error variance calculation unit configured to calculate the error variance of the error distributing like an ellipse whose center is the absolute position of the moving object, and the existence probability calculation unit comprises:
    an axis calculation unit configured to calculate at least one of a long axis and a short axis with respect to the error variance calculated by the error variance calculation unit;
    an intersection calculation unit configured to calculate an intersection between the road information read out by the read-out unit and at least one of the long axis and the short axis calculated by the axis calculation unit; and
    an intersection-existence-probability calculation unit configured to calculate an existence probability from the absolute position of the moving object and the intersection calculated by the intersection calculation unit.

3. The position detection apparatus according to claim 1, wherein the position calculation unit comprises an error variance calculation unit configured to calculate the error variance of the error distributing like an ellipse whose center is the absolute position of the moving object, and the existence probability calculation unit comprises:
   a road-distribution-function calculation unit configured to calculate a road distribution function from the road information read out by the read-out unit; and
   an overlap-part extraction unit configured to extract a part where the error variance calculated by the error-variance calculation unit and the road distribution function calculated by the road-distribution-function calculation unit overlap,
   wherein the selection unit selects a most overlapping position on the road, based on the overlapping part extracted by the overlap-part extraction unit.

4. A non-transitory, computer-readable medium embodying a position detection program readable and performed by a computer of a position detection apparatus for deciding a position of a moving object on a road, the program, when executed by a computer, effects operations comprising:
   storing map information including road information;
   detecting information for calculating an absolute position of the moving object;
   calculating the absolute position of the moving object and an error variance relating to an error of the moving object from the detected information;
   reading out the road information of the road relating to the calculated absolute position from the stored map information;
   calculating an existence probability of the moving object existing on the road from the calculated absolute position, the calculated error variance, and the read-out road information;
   selecting a position whose existence probability is maximum out of the calculated existence probability; and
   making the selected position the position of the moving object on the road.

5. The non-transitory, computer-readable medium according to claim 4, wherein the calculating the error variance comprises calculating the error variance of the error distributing like an ellipse whose center is the absolute position of the moving object, and the calculating the existence probability comprises:
   calculating at least one of a long axis and a short axis with respect to the calculated error variance;
   calculating an intersection between the read-out road information and at least one of the calculated long axis and the calculated short axis;
   calculating an existence probability from the absolute position of the moving object and the calculated intersection;
   selecting a position whose existence probability is maximum out of the calculated existence probability; and
   making the selected position the position of the moving object on the road.

6. The non-transitory, computer-readable medium according to claim 4, wherein the calculating the error variance comprises calculating the error variance of the error distributing like an ellipse whose center is the absolute position of the moving object, and the calculating the existence probability comprises:
   calculating a road distribution function from the read-out road information; and
   extracting a part where the calculated error variance and the calculated road distribution function overlap,
   wherein selecting the position comprising selecting a most overlapping position on the road, based on the overlapping part extracted by the extracting the part.

7. A position detection method performed by a computer, for deciding a position of a moving object on a road, the method comprising:
   storing map information including road information;
   detecting information for calculating an absolute position of the moving object;
   calculating the absolute position of the moving object and an error variance relating to an error of the moving object from the detected information;
   reading out the road information of the road relating to the calculated absolute position from the stored map information;
   calculating an existence probability of the moving object existing on the road from the calculated absolute position, the calculated error variance, and the read-out road information;
   selecting a position whose existence probability is maximum out of the calculated existence probability; and
   making the selected position the position of the moving object on the road.

8. The position detection method according to claim 7, wherein the calculating the error variance comprises calculating the error variance of the error distributing like an ellipse whose center is the absolute position of the moving object, and the calculating the existence probability comprises:
   calculating at least one of a long axis and a short axis with respect to the calculated error variance;
   calculating an intersection between the read-out road information and at least one of the calculated long axis and the calculated short axis;
   calculating an existence probability from the absolute position of the moving object and the calculated intersection;
   selecting a position whose existence probability is maximum out of the calculated existence probability; and
   making the selected position the position of the moving object on the road.

9. The position detection method according to claim 7, wherein the calculating the error variance comprises calculating the error variance of the error distributing like an ellipse whose center is the absolute position of the moving object, and the calculating the existence probability comprises:
   calculating a road distribution function from the read-out road information; and
   extracting a part where the calculated error variance and the calculated road distribution function overlap,
   wherein selecting the position comprising selecting a most overlapping position on the road, based on the overlapping part extracted by the extracting the part.

* * * * *